(12) United States Patent
Stoppe

(10) Patent No.: US 9,336,580 B2
(45) Date of Patent: May 10, 2016

(54) METHODS AND APPARATUSES FOR IMAGE PROCESSING

(71) Applicant: Carl Zeiss AG, Oberkochen (DE)

(72) Inventor: Lars Stoppe, Jena (DE)

(73) Assignee: CARL ZEISS AG, Oberkochen (DE)

(*) Notice: Subject to any disclaimer, the term of this patent is extended or adjusted under 35 U.S.C. 154(b) by 0 days.

(21) Appl. No.: 14/387,740

(22) PCT Filed: Mar. 25, 2013

(86) PCT No.: PCT/EP2013/056317
§ 371 (c)(1),
(2) Date: Sep. 24, 2014

(87) PCT Pub. No.: WO2013/144100
PCT Pub. Date: Oct. 3, 2013

(65) Prior Publication Data
US 2015/0071560 A1 Mar. 12, 2015

(30) Foreign Application Priority Data
Mar. 29, 2012 (DE) .................. 10 2012 102 707

(51) Int. Cl.
*G06K 9/00* (2006.01)
*G06T 5/10* (2006.01)
*G06T 5/00* (2006.01)

(52) U.S. Cl.
CPC . *G06T 5/10* (2013.01); *G06T 5/002* (2013.01); *G06T 5/003* (2013.01); *G06T 2207/20024* (2013.01); *G06T 2207/20064* (2013.01); *G06T 2207/20172* (2013.01)

(58) Field of Classification Search
None
See application file for complete search history.

(56) References Cited

U.S. PATENT DOCUMENTS 6,990,246 B1* 1/2006 Ferguson ............. H04N 19/172
375/E7.037
2012/0328210 A1* 12/2012 Fattal ..................... G06T 3/403
382/264

OTHER PUBLICATIONS

Ercelebi, et al. Lifting-Based Wavelet Domain Adaptive Wiener Filter for Image Enhancement. IEE Proceedings-Vision, Image and Signal Processing 153, No. 1 (2006): 31-36.
Li, Xin. New results of phase shifting in the wavelet space. Signal Processing Letters, IEEE 10, No. 7 (2003): 193-195.
Vetterli, et al. Wavelets and Subband Coding. vol. 87. Englewood Cliffs, New Jersey: Prentice Hall PTR, 1995.ril, 1995.
Vonesch, et al. A fast Multilevel Algorithm for Wavelet-Regularized Image Restoration. Image Processing, IEEE Transactions on 18, No. 3 (2009): 509-523.
International Search Report of PCT/EP2013/056317, Mailed Jun. 24, 2013, Applicant: Carl Zeiss AG, 11 pages.

* cited by examiner

*Primary Examiner* — Hadi Akhavannik
(74) *Attorney, Agent, or Firm* — Seyfarth Shaw LLP; Brian Michaelis

(57) ABSTRACT

Methods and apparatuses for image enhancement are provided, with which convolution operations can be carried out directly in a filter space, for example in a wavelet space, in particular directly on compressed data.

16 Claims, 15 Drawing Sheets

METHODS AND APPARATUSES FOR IMAGE PROCESSING

RELATED CASE INFORMATION

The present application is a U.S. National Stage application of International Application No. PCT/EP2013/056317 filed Mar. 25, 2013, which claims priority from German Patent Application No. DE102012102707.2 filed on Mar. 29, 2012, both of which are incorporated herein by reference in their entirety.

FIELD OF THE INVENTION

The present application relates to methods and apparatuses for image processing, where appropriate together with image acquisition, which can be used, for example, for enhancing the quality of the image.

BACKGROUND

In many applications, particularly in optics, for example in microscopy, large sets of image data accrue. One possibility to compress image data of such a type consists in the application of a biorthogonal filter bank to the respective images, followed by a compression of the result, for example omitting elements that are equal to zero (or, where appropriate, close to zero). A special case of such a filter bank of this is so-called wavelet decomposition, which will be elucidated in more detail later.

For the purpose of processing images of such a type, convolution and deconvolution operations are frequently used, whereby deconvolution operations may be represented iteratively by convolutions. For example, a recorded image represents a convolution between an image component that has its origin solely in a recorded object and a point spread function (PSF) of an image-recording device being used, which essentially describes how a discrete point is imaged and consequently describes the behaviour of the image-recording device being used. By virtue of an appropriate deconvolution, the influence of the image-recording device can be removed by computation, and consequently the quality of the image can be enhanced.

Accordingly, it is desirable to provide possibilities by which convolution operations of such a type with filtered and/or compressed image data, in particular with wavelet-decomposed image data, can be carried out. Appropriate methods are known, for example, from P. P. Vaidyanathan, "Orthonormal and biorthonormal filter banks as convolvers, and convolutional coding gain", IEEE Trans. Signal Processing, Vol. 41, pages 2110-2130, June 1993, and Iddo Drori, Dani Lischinski, "Fast Multiresolution Image Operations in the Wavelet Domain", IEEE Transactions on Visualization and Computer Graphics, Vol. 09, No. 3, pages 395-411, July-September 2003. With the algorithms described therein, however, the result of the convolution is present in the local space, i.e. not in wavelet-decomposed form, and consequently, in particular, in uncompressed form, so that subsequently with a view to compressed storage a filtering, in particular a wavelet decomposition, again has to be performed, which requires a corresponding computing capacity.

Therefore, there is a need for methods and apparatuses with which an image processing of such a type, in particular the application of convolution operations, is possible in efficient manner.

SUMMARY

According to an aspect, a method for image enhancement is provided, comprising: recording an image, applying a biorthogonal filter bank to the image, in order to generate an image in the filter space, applying a convolution operation to the image in the filter space such that the result of the convolution operation is again present in the filter space, and outputting a result image on the basis of the result of the convolution operation.

The image and the assigned images in this case are not restricted to one-dimensional and two-dimensional images and image data. Generally, an 'image' within the scope of this patent application may also designate three-dimensional or higher-dimensional data or even data that have multiple components in some other way, for example if, in the case of image data, colour components have been stored separately and consequently the colour represents, as it were, a further dimension. The images do not have to be colour images in the visible region, but rather it may also be a question of, for example, a 3D image, an X-ray image, a data set recorded by electron microscopy or other measuring methods such as X-ray diffraction, or an infrared image, to name a few examples. Generally, the image or the image data accordingly describe(s) properties, in particular structural properties such as the appearance of the article or object, the image of which was recorded.

The method may further include a compressing of the image in the filter space, whereby the application of the convolution operation takes place on the compressed image and the result of the convolution operation has again been compressed.

The convolution operation may include a convoluting with a kernel that is based on a point spread function.

The application of the convolution operation may include a splitting of the kernel into several components, for example into even and odd components.

The implementation of the convolution operation may also include an application of the biorthogonal filter bank to the kernel, in order to generate components of the kernel in the filter space.

The application of the convolution operation may also include a formation of auxiliary vectors on the basis of vectors characterising the biorthogonal filter bank and on the basis of a shift operation.

By using the auxiliary vectors, in this case a simplification can be obtained.

The auxiliary vectors may in one embodiment be convoluted with components of the kernel. By this means, a simplification can be obtained, particularly in the case of iterative methods, since, in particular, the aforementioned convolution of the kernel has to be computed only once.

A wavelet decomposition can be carried out by the biorthogonal filter bank.

The method may include an iterative application of convolution operations, including the convolution operation in order to carry out a deconvolution.

According to a further aspect, an apparatus is provided, comprising:
an image-recording device for recording an image,
a biorthogonal filter bank, in order to obtain an image in the filter space from the recorded image, and
an image-enhancement unit for applying a convolution operation to the image in the filter space in such a way that the result is again present in the filter space, and for outputting a result image on the basis of the result of the convolution operation.

The apparatus may have been set up for implementing one of the methods described above.

By virtue of the fact that the result of the convolution operation in the case of methods and apparatuses according to the invention is once again present in the filter space, for example in compressed form, the processing can take place efficiently and in memory-saving manner.

By iterative application of convolution operations of such a type, a deconvolution, in particular with a point spread function, can also take place.

DETAILED DESCRIPTION

Embodiments will be elucidated below with reference to the appended drawing. It should be noted that features of various embodiments can be combined with one another, unless stated otherwise. On the other hand, a description of an embodiment having a plurality of features should not be interpreted to the effect that all these features are necessary for implementation, since other embodiments may also exhibit fewer features and/or alternative features.

In the embodiments described in the following, use is made of a decomposition of data, in particular image data, by means of a biorthogonal filter system. By way of preferred embodiment of a biorthogonal filter system of such a type, use is made of a wavelet decomposition, by virtue of which a compression of image data, for example, is possible. In order to facilitate understanding of the embodiments presented in the following, firstly a brief overview of wavelet decomposition and of terms used in the following will be given.

A wavelet decomposition (DWT—discrete wavelet transform) is a decomposition of a function $f$ into an orthogonal function system which consists of shifted and shrunk/stretched versions of two functions: the scaling function $\Phi$ and the mother wavelet $\psi$.

The scaling function and the mother wavelet in this case are defined via a vector (scaling-function vector) h and the following recursive equations:

$$\Phi(x) = \sum_k h(k)\sqrt{2} \cdot \Phi(2 \cdot x - k)$$

$$\Psi(x) = \sum_k (-1)^k h(N-k)\Phi(2 \cdot x - k)$$

If the vector h is finite (which is the case in the applications described later), the discrete wavelet decomposition can be computed via a FIR filter bank with the filters h and $h_1$: $h_1(k)=(-1)^k$ if $h(N-k)$ In the case of the DWT the input signal is decomposed into two output signals of half length. By reason of the properties of the functions $\Phi$ and $\psi$, the 1st signal (phi component, formed by means of the vector h and the functions $\Phi$) has a shape similar to the input signal and possesses the principal part of the energy, whereas in the 2nd output signal (psi component, formed by means of the vector $h_1$ and the functions $\psi$) detailed information in the input signal have been coded and almost no energy is contained (low values). This is also utilised in the course of denoising and in the course of compression, where very low values of the psi component are set to zero.

Figure 1:
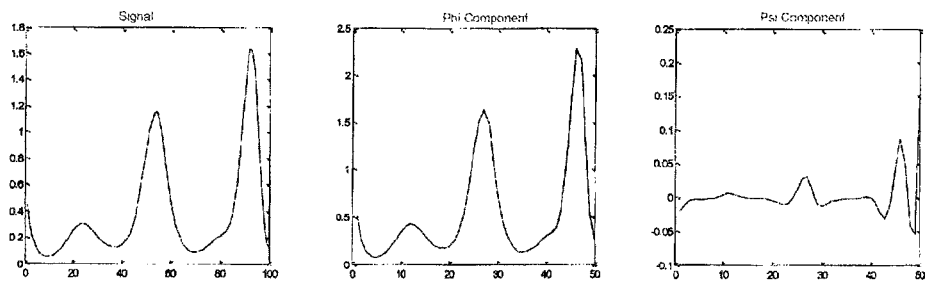
FIGS. 1-4: graphs and diagrams for elucidating wavelet decompositions.

This has been represented schematically in FIG. 1. The left-hand graph in this Figure shows an example of an original signal; the middle graph shows an example of the phi component which in its shape corresponds substantially to the original signal; and the right-hand graph shows the psi component which, as is evident, is at or close to zero.

For a storage and signal treatment that are as compact as possible, in general the phi component is now decomposed further. Hence several psi components of various magnitudes arise, and the DWT of lower stages are obtained.

Figure 2:
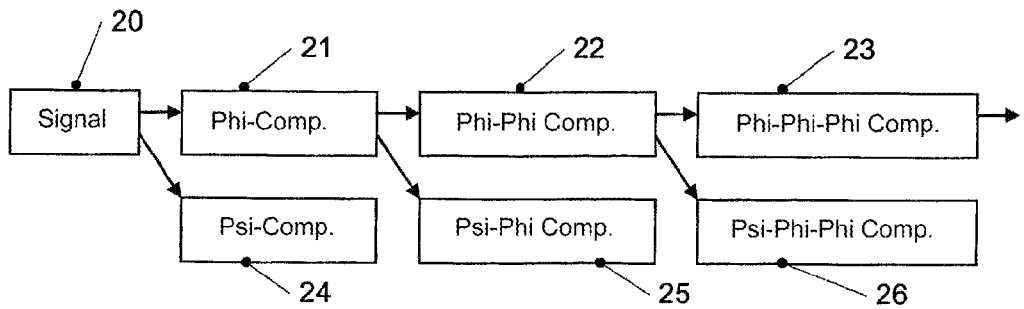

This has been represented schematically in FIG. 2. Here a signal 20, which, for example, may represent image data, is firstly decomposed into a phi component 21 and a psi component 24. The phi component 21 is then decomposed by means of a further wavelet decomposition into a phi-phi component 22 and a psi-phi component 25. The phi-phi component 22 is then decomposed by means of a further wavelet decomposition into a phi-phi-phi component 23 and a psi-phi-phi component 26. This procedure be continued, so that the number of stages of the decomposition can essentially be chosen arbitrarily. In this connection the length of the individual components is reduced by one half at each stage. From all the psi components and the last phi component it is subsequently possible for the original signal to be reconstructed perfectly.

For example, the phi-phi-phi component 23 and the psi-... . components 24, 25 and 26 are stored. With a view to reconstructing the signal 20, from the phi-phi-phi component 23 and the psi-phi-phi component 26 the phi-phi component 22 is then computed; from the latter, together with the phi-phi component 25, the phi component 21 is computed; and from the latter, together with the psi component 24, the signal 20 is computed.

It will be seen that a signal in the wavelet space can be stored at the same length, no matter how deeply the signal is decomposed. But since, as seen above, the psi components are 0 by approximation and are frequently even equal to 0, the wavelet decomposition is suitable for data compression, this being utilised in the JPG2000 standard, for example.

The fact that the DWT can be represented as a FIR filter bank leads to the following symbolic notation:

phi component: $Signal_\phi=(Signal*h)\downarrow$ psi component: $Signal_\psi=(Signal*h_1)\downarrow$ In this case, h and $h_1$ are the vectors defined above and $\downarrow$ is the downsampling operator, which has the consequence that only every 2nd element of a vector is stored. The subscripts $\phi$ and $\psi$ indicate which component is being computed.

The advantage of the above computation is that a decomposition of a signal can be computed that can be utilised effectively for data compression and for denoising without great memory effort and without long computing-time. However, the disadvantages are, on the one hand, that this transform is not shift-invariant, and, on the other hand, that the individual components are of differing magnitudes. Both problems can be circumvented by utilising varied transforms.

In order to produce the shift invariance, the DWT of all shifted versions of the signal can be computed and stored simultaneously. This can, for example, be obtained by the downsampling operator being omitted in the above computation. Generally, in this way the length of the sub-bands is not reduced and the total length of the transformed signal becomes greater (length N→length N·(T+1), T . . . depth of the DWT).

This form of wavelet decomposition is called here UDWT—undecimated discrete wavelet transform. But the designations SWT—stationary discrete wavelet transform—and RDWT—redundant discrete wavelet transform—are also customary. The disadvantage of this transform is the greater memory effort and computing effort. The latter rises distinctly in the case of multi-dimensional problems.

Figure 3:
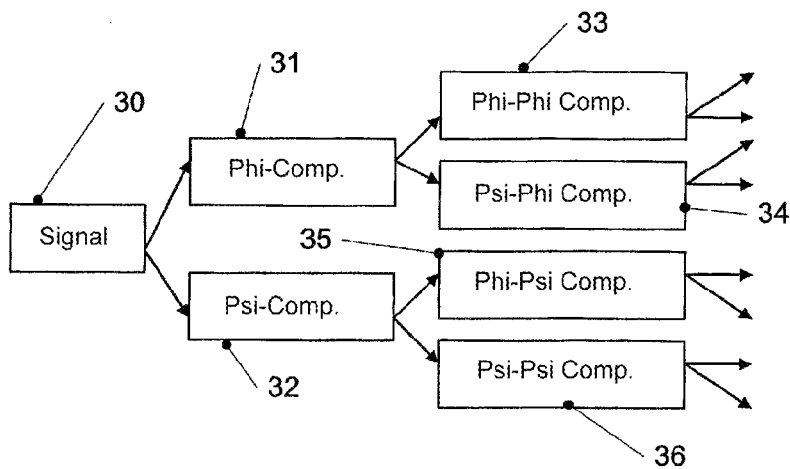

In order to keep all the components at all depths of the DWT always of equal magnitude, it is also possible to decompose the psi components further. Hence the decomposition is given a tree structure which has been represented in FIG. 3. Here a signal 30 is decomposed by a wavelet decomposition into a phi component 31 and a psi component 32. The phi component 31 is decomposed by a further wavelet decomposition into a phi-phi component 33 and a psi-phi component 34. The psi component 32 is decomposed by a further wavelet decomposition into a phi-psi component 35 and a psi-psi component 36. This decomposition can also be continued arbitrarily.

This decomposition still utilises the downsample operators, so that the magnitude of the signal does not increase. However, the computing-time of the transform is now longer, since (depending upon the stage) more decompositions have to be done This transform is designated in this text by WP—wavelet-packet decomposition.

If in the course of the wavelet-packet decomposition in addition the downsample operators are omitted, accordingly if the WPs of all the shifted signals are stored, then the UWP—undecimated wavelet-packet decomposition—is obtained. The latter is obviously very computing-intensive and memory-intensive.

If it is desired to compute a wavelet decomposition of a multi-dimensional object (dimension d≥2), then the computation described above has to be executed for each dimension individually. Hence more-complex structures arise in the DWT/WP/UDWT/UWP. The particular feature is that now there is no longer only one psi component but rather $2^d-1$ different ones. But in multi-stage DWTs only the phi component continues to be decomposed.

Figure 4:
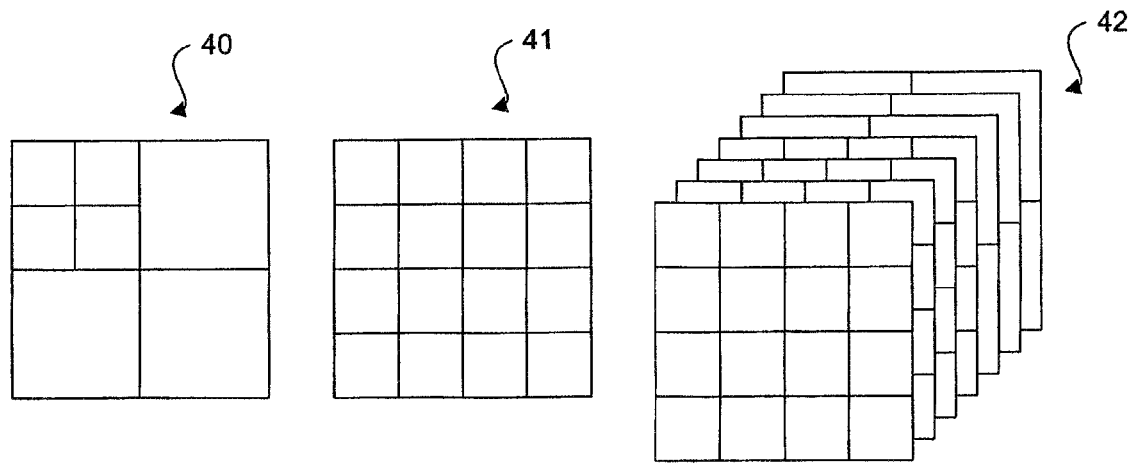

Schematic representations of the various decompositions for a two-stage two-dimensional decomposition have been represented in FIG. 4, wherein a DWT decomposition has been denoted by 40, a WP decomposition (all resulting components are of equal magnitude) by 41, and a UDWT decomposition by 42.

Designations will now be defined that are utilised below.
h . . . FIR filter of the wavelets (see above)

$h_1$ . . . defined as above $\overset{z}{*}$ . . . row-by-row convolution $\overset{s}{*}$ . . . column-by-column convolution $\overset{t}{*}$ . . . depth-wise convolution (via the 3rd dimension in the case of 3d)

$\downarrow_z$ . . . row downsample operator, deletes every 2nd element of the rows $\downarrow_s$ . . . column downsample operator, deletes every 2nd element of the columns $\downarrow_t$ . . . depth downsample operator, deletes every 2nd element of the 3rd dim.

$\uparrow$ . . . upsample operator, inserts a 0 between each two elements of the vector and appends a 0 at the end $\tilde{\uparrow}$ . . . shifted upsample operator, inserts a 0 between each two elements of the vector and appends a 0 at the beginning $f_\phi$ . . . phi component of $f$ $f_\psi$ . . . psi component of $f$ $\ddot{f}$ . . . $f$ flipped (read from back to front or from top to bottom)

Notations used in the following for the wavelet decomposition will now be presented. In this case there are three possibilities of representation, two of which will be mainly used in the further treatment. These three possibilities are designated here as analytic notation, filter-bank/convolution notation and as matrix notation.

1. Analytic Notation

Since in the case of the wavelet decomposition it is a question, in principle, only of an orthogonal decomposition of a function into an orthogonal system, it can be represented via scalar products or integrals. To this end, the following two sets of functions are defined:

$$\Phi_k^L(x) = 2^{L/2} \cdot \Phi(2^L \cdot x - k)$$
$$\Psi_k^j(x) = 2^{j/2} \cdot \Psi(2^j \cdot x - k)$$

It then holds that the DWT(f)={a,b} can be computed as:

$$a_k = \langle f, \Phi_k^L \rangle = \int f(x) \cdot \Phi_k^L(x) dx \quad b_{j,k} = \langle f, \Psi_n^j \rangle = \int f(x) \cdot \Psi_n^j(x) dx \; k, n \in \{-M, \ldots, M\} \; j \in \{L, \ldots, L+T\}$$

2. Filter-Bank/Convolution Notation

As already mentioned above, the definition of the scaling function can be utilised to program the DWT (of a discrete signal) effectively as a filter bank. The phi component of the 1d signal is then:

$$f_\phi = (f * h) \downarrow$$

Analogously, the psi component can be computed as:

$$f_\psi = (f * h_1) \downarrow$$

The reconstruction of the original signal $f$ from the DWT is written in this notation as:

$$f = ((f * h) \downarrow) \uparrow) * \ddot{h} + ((f * h_1) \downarrow) \uparrow) * \ddot{h}_1$$

3. Matrix Notation

With the aid of Toeplitz convolution matrices it is possible for notation 2 to be represented also in the form of a matrix multiplication. To this end, we define the wavelet-transform matrix W as follows:

$$W = \begin{pmatrix} h(4) & h(3) & h(2) & h(1) & 0 & \ldots & 0 & 0 \\ 0 & 0 & h(4) & h(3) & h(2) & \ldots & 0 & 0 \\ 0 & 0 & 0 & 0 & h(4) & \ldots & 0 & 0 \\ \ddots & \ddots & \ddots & \ddots & \ddots & \ldots & \ddots & \ddots \\ h(2) & h(1) & 0 & 0 & 0 & \ldots & h(4) & h(3) \\ h_1(4) & h_1(3) & h_1(2) & h_1(1) & 0 & \ldots & 0 & 0 \\ 0 & 0 & h_1(4) & h_1(3) & h_1(2) & \ldots & 0 & 0 \\ 0 & 0 & 0 & 0 & h_1(4) & \ldots & 0 & 0 \\ \ddots & \ddots & \ddots & \ddots & \ddots & \ldots & \ddots & \ddots \\ h_1(2) & h_1(1) & 0 & 0 & 0 & \ldots & h_1(4) & h_1(3) \end{pmatrix}$$

$$\begin{pmatrix} f_\varphi \\ f_\psi \end{pmatrix} = W \cdot f$$

where it holds that: $W \cdot W^T = I$

The wavelet transform is then simply only a matrix multiplication, whereby the downsample operators have been implicitly integrated within the matrix W and the result already contains both DWT components. Similarly, in principle it is also possible for an arbitrary-stage DWT to be represented in 1d. A WP decomposition (of arbitrary stage) in 1d/2d is also possible by means of the matrix notation.

Conventions:

All the convolutions represented here are cyclic convolutions. Moreover, all the shifts noted here are cyclic. Unless stated otherwise, in the case of the wavelets that have been given with h it is accordingly a question of orthogonal wavelets (for definition, see below).

Figure 5:
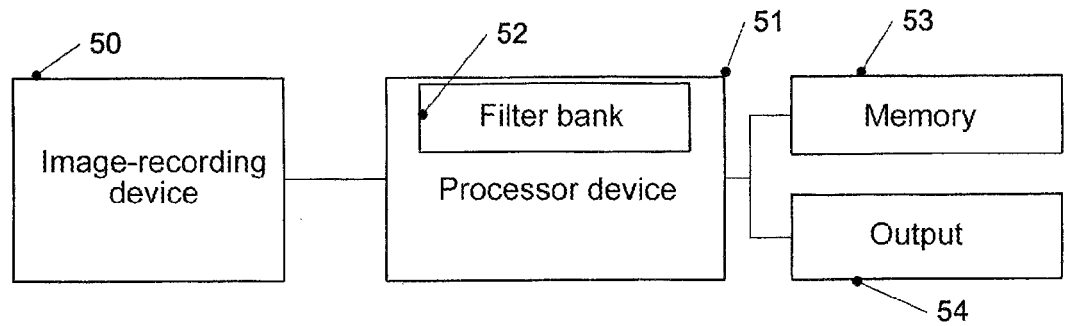
FIG. 5: a block diagram of an apparatus according to one embodiment.

In FIG. 5 an apparatus according to an embodiment of the invention has been represented. The apparatus shown in FIG. 5 includes an image-recording device 50 for generating image data. The image-recording device 50 may be, for example, a microscope with camera or other image-recording device, for example a laser scanning microscope (LSM), a SPIM microscope (selective plane illumination microscopy) or an image-recording device for three-dimensional image recording.

The images recorded by the image-recording device 50 are transferred to a method or device 51 for image processing. The processor device 51 includes a biorthogonal filter bank 52, for example a FIR filter bank for wavelet decomposition as discussed above. Filtered image data can be saved in a memory 53 and/or can be output via an output 54, for example a display screen.

Via the processor device 51, in addition an image enhancement can be carried out. To this end, in particular a deconvolution of the recorded image with the point spread function (PSF) of the image-recording device 50 is carried out, in order consequently to remove the influence of the image-recording device 50 from the image, at least partly, by computation. This deconvolution can be represented iteratively by a plurality of convolutions. In embodiments of the invention, algorithms are used for this which the convolution or deconvolution carries out directly with the filtered image data, for example wavelet-decomposed image data, specifically in such a way that the result is directly present again in filtered form. As mentioned above, for example a wavelet decomposition may have been combined with a compression, so that in this way the convolution operations can be carried out without decompression.

Possible algorithms for this purpose will be elucidated in the following. In this connection in the following, $f$ denotes a function on which the convolution operation is carried out, for example the image data (which represent a two-dimensional function), and g denotes a kernel, for example the aforementioned point spread function or a function based thereon.

A basic algorithm for this, designated in the following as algorithm 0, is derived in the matrix notation as follows:

$$W_1 \cdot (g * f) = \sum_j g(j) \cdot W_1 \cdot (S_{j-1} f)$$

$$= \sum_k g(2k+1) \cdot W_1 \cdot (S_{2k} f) + \sum_k g(2k) \cdot W_1 \cdot (S_{2k-1} f)$$

$$= \sum_k g(2k+1) \cdot \tilde{S}_k \cdot (W_1 \cdot f) + \sum_k g(2k) \cdot \tilde{S}_{k-1} \cdot (W_1 S_1 f)$$

$$= g_{odd_{sb}} * (W_1 \cdot f) + g_{even_{sb}} * (W_1 \cdot S_1 \cdot f)$$

$$\begin{pmatrix} (g * f)_\varphi \\ (g * f)_\psi \end{pmatrix} = \begin{pmatrix} g_{odd} * f_\varphi \\ g_{odd} * f_\psi \end{pmatrix} + \begin{pmatrix} g_{even} * (S_1 \cdot f)_\varphi \\ g_{even} * (S_1 \cdot f)_\psi \end{pmatrix}$$

That is to say, the kernel is split into even ($g_{even}$) and odd ($g_{odd}$) elements, these two constituent parts have to be convoluted onto the sub-bands of the UWP corresponding to the shift and, in each instance, equal sub-bands have to be added. In the above formulae a shift operator by n elements has been designated by $S_n$, whereby for n=1 the index n in the following is also omitted. The tilde over the S denotes a shift of such a type, which acts only on the sub-band being considered in the given case (i.e. the part of the corresponding elements). $W_1$ denotes the convolution matrix as elucidated above.

As can be seen, in this way the phi and psi components of the convolution can be computed directly.

Figure 6:
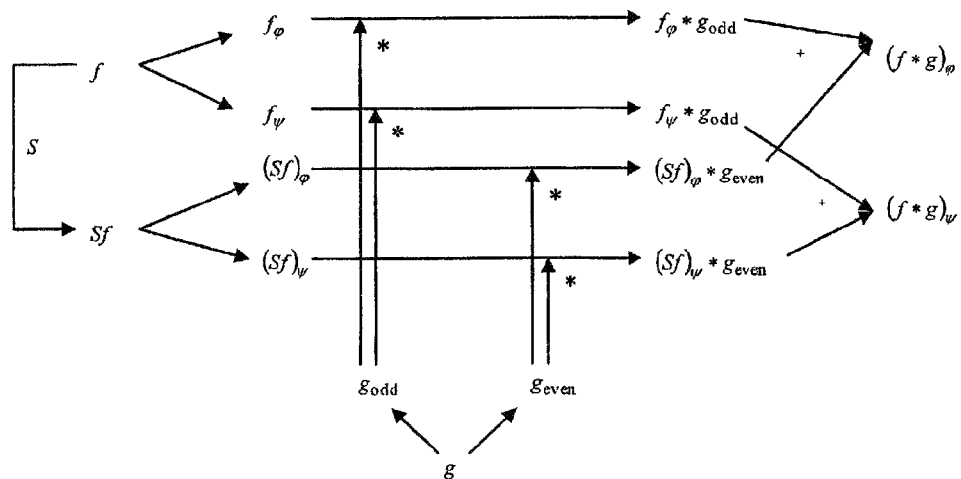
FIG. 6: a diagram for illustrating a computation of convolutions that is used in many embodiments.

The above algorithm has been represented graphically in FIG. 6.

This algorithm works in corresponding manner in multi-dimensional and higher-stage problems.

Only, depending upon the dimension of the problem and the depth of the WP of the kernel, decomposition has to be effected into more than two parts, specifically into precisely $(2^T)^d$ many parts, where d denotes the dimension and T denotes the depth. The decomposition is carried out as follows:

a) start at point $(i_1, i_2, \ldots, i_d)$ of the kernel b) take (in each direction of the dimension) every $2^T$ th element c) do this with all possible combinations $(i_1, i_2, \ldots, i_d)$ with $1 \leq i_j \leq 2^T - 1 \forall j$ By virtue of the starting-points $(i_1, i_2, \ldots, i_d)$, a shift can be assigned to each subkernel defined in this way. (Example (2,1)→horizontal shift by 1, vertical shift by 0)

Now only the subkernels with the WPs of the shifted signal pertaining to them have to be convoluted, sub-band by sub-band, and subsequently all equal sub-bands added, in order to get the WP of the result of convolution.

Although this algorithm, considered in itself, still does not have the desired property, namely that result and input signal lie in the same space (wavelet space), (i.e. f and $S_1 f$ have to be decomposed separately), the following three variants can be derived from it:

A first variant is designated in the following as sub-band convolution with shift variation, or as algorithm 1.

This algorithm convolutes a wavelet-packet-decomposed signal with a convolution kernel that is present in the local space. The result is present in the wavelet-packet space (in the same space as the signal).

Derivation:

Derivation from the above formula of algorithm 0 with the matrix notation in 1d in one stage:

$$W_1 \cdot (g * f) = \sum_j g(j) \cdot W_1 \cdot (S_{j-1} f)$$
$$= g_{odd_{sb}} * (W_1 \cdot f) + g_{even_{sb}} * (W_1 \cdot S_1 \cdot f)$$
$$= g_{odd_{sb}} * (W_1 \cdot f) + g_{even_{sb}} * (W_1 \cdot S_1 \cdot W_1^T \cdot W_1 \cdot f)$$
$$= g_{odd_{sb}} * (W_1 \cdot f) + g_{even_{sb}} * (X_1 \cdot W_1 \cdot f)$$

$$\begin{pmatrix} (g*f)_\varphi \\ (g*f)_\psi \end{pmatrix} = \begin{pmatrix} g_{odd} * f_\varphi \\ g_{odd} * f_\psi \end{pmatrix} + \begin{pmatrix} g_{even} * (f_\varphi * sh_o^\varphi + f_\psi * sh_1^\varphi) \\ g_{even} * (f_\varphi * sh_0^\psi + f_\psi * sh_1^\psi) \end{pmatrix}$$

with $$X_1 = W_1 \cdot S_1 \cdot W_1^T$$

If this variant is compared with that above, it will be discerned that here the WP decomposition of the shifted version of the signal $S_1 f$ is no longer needed, but that said decomposition is computed from the 'normal' WP decomposition of the signal with the aid of auxiliary vectors $sh_0^\Phi$, $sh_1^\Phi$, $sh_0^\Psi$ and $sh_1^\Psi$.

Accordingly, the individual components of the WP decomposition of the convolution $((g*f)_\varphi, (g*f)_\psi)$ can be computed directly from the components of the wavelet decomposition of the signal $(f_\varphi, f_\psi)$.

These auxiliary vectors themselves originate from the above matrix X. Said matrix is the WP decomposition of the shift matrix. However, if the product $W \cdot S \cdot W^T$ is written as $W \cdot (S \cdot W^T)$, it will be discerned that the auxiliary vectors (in the one-stage case) are computed by a WP decomposition of the vectors (0 h 0 . . . 0) and (0 $h_1$ 0 . . . 0). In the lower-stage case the requisite auxiliary vectors arise in corresponding manner; only the structure of the matrix W has to be known.

Figure 7:
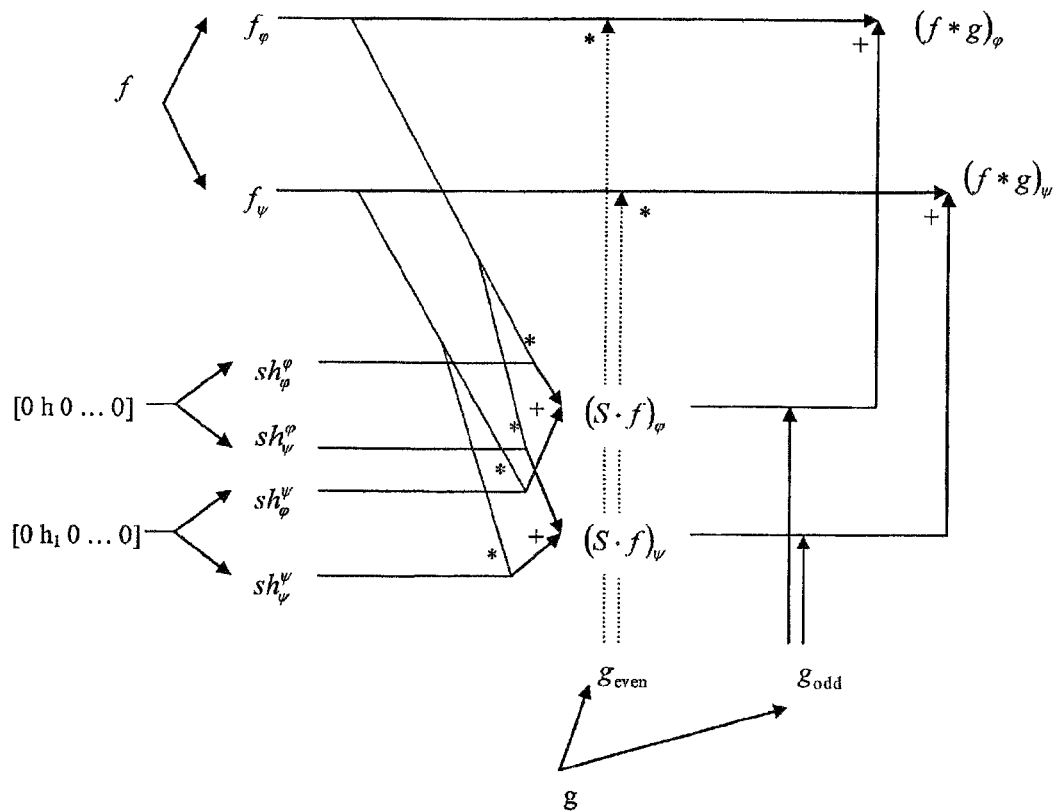
FIG. 7: a further diagram for illustrating convolution operations that are used in many embodiments.

This algorithm 1 has been represented graphically in FIG. 7.

Sequence of Algorithm 1:

Input quantities: WP decomposition of the signal, kernel in the local space a) Decomposing of the kernel into subkernels b) For each subkernel a. determination of the WP decomposition of the associated shifted signal by means of the auxiliary vectors b. convolution of the subkernel onto all sub-bands of this WP decomposition c) For each sub-band a. summation over all shifts b. assignment of the sum into the corresponding sub-band of the result Output quantities: WP decomposition of the result of convolution A second algorithm, also designated as algorithm 2, is designated as 'sub-band convolution with kernel variation'. This algorithm 2 is derived directly from algorithm 1. In principle, only a re-sorting of the reckoning of the auxiliary vectors is performed, in order to circumvent the computation of the WPs of the shifted signals.

Derivation:

The derivation can again be represented most clearly in the matrix notation $$W \cdot (g*f) = \sum_k g(2k+1) \cdot \tilde{S}_k \cdot (W \cdot f) + \sum_k g(2k) \cdot \tilde{S}_k \cdot (X \cdot (W \cdot f))$$

$$= \begin{pmatrix} g_{odd} * f_\varphi \\ g_{odd} * f_\psi \end{pmatrix} + \begin{pmatrix} g_{even} * (f_\varphi * sh_o^\varphi + f_\psi * sh_1^\varphi) \\ g_{even} * (f_\varphi * sh_0^\psi + f_\psi * sh_1^\psi) \end{pmatrix}$$

$$= \begin{pmatrix} f_\varphi * (g_{odd} + g_{even} * sh_o^\varphi) \\ f_\varphi * (g_{even} * sh_0^\psi) \end{pmatrix} + \begin{pmatrix} f_\psi * (g_{even} * sh_1^\varphi) \\ f_\psi * (g_{odd} + g_{even} * sh_1^\psi) \end{pmatrix}$$

$$(g*f)_\varphi = f_\varphi * (g_{odd} + g_{even} * sh_o^\varphi) + f_\psi * (g_{even} * sh_1^\varphi),$$

kernel variation No.1: $g \to \left[ \dfrac{g_\varphi^\varphi}{g_{odd} + g_{even} * sh_o^\varphi} \quad \dfrac{g_\psi^\varphi}{g_{even} * sh_1^\varphi} \right]$ $$(g*f)_\psi = f_\varphi * (g_{even} * sh_0^\psi) + f_\psi * (g_{odd} + g_{even} * sh_1^\psi),$$

kernel variation No.2: $g \to \left[ \dfrac{g_\varphi^\psi}{g_{even} * sh_0^\psi} \quad \dfrac{g_\psi^\psi}{g_{odd} + g_{even} * sh_1^\psi} \right]$ $$\Downarrow$$

$$(g*f)_\varphi = f_\varphi * g_\varphi^\varphi + f_\psi * g_\psi^\varphi$$

$$(g*f)_\psi = f_\varphi * g_\varphi^\psi + f_\psi * g_\psi^\psi$$

It will be discerned that the reckoning of the auxiliary vectors can be carried across to the kernel g. If the kernel is doubled and if both kernel variations described above are executed, the components of the result of convolution can be computed directly from the components of the input signal, without having to make an elaborate intermediate computation. Hence this algorithm is well suited for an iterative application, above all when the convolution kernel is small and a low-level WP is being utilised, since the kernel variations have to be computed only once.

Figure 8:
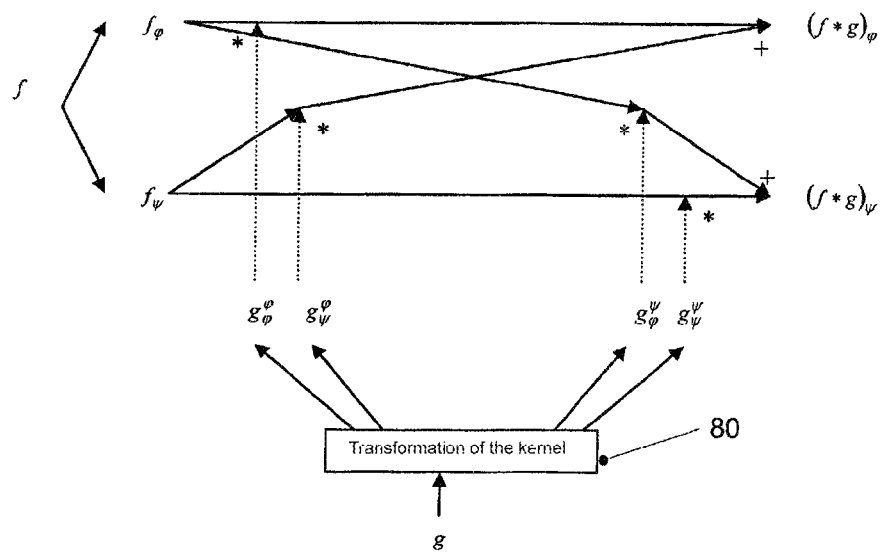
FIG. 8: a schematic diagram for illustrating convolution operations in many embodiments of the invention.
Figure 9:
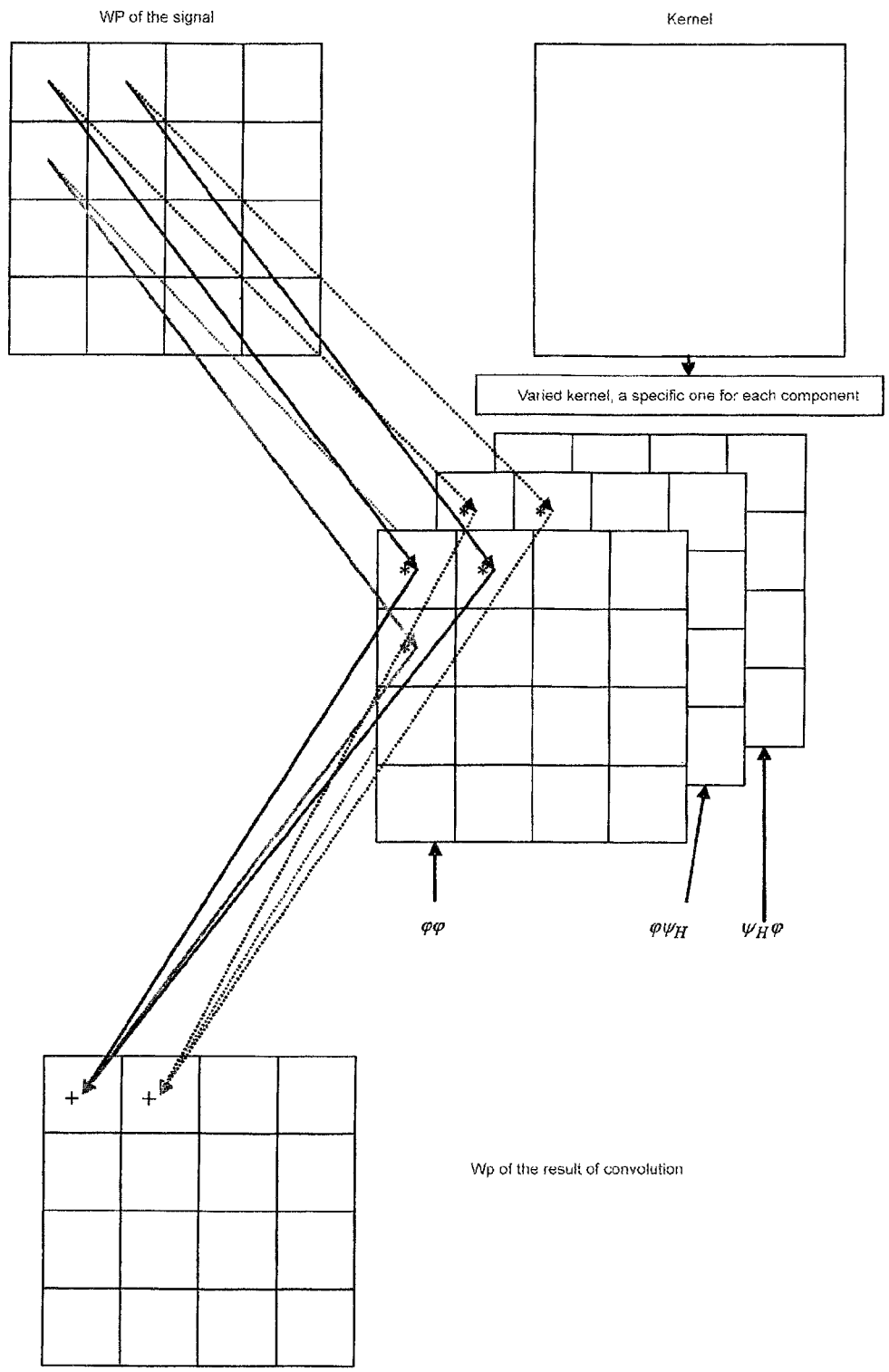
FIG. 9: a diagram for illustrating a two-dimensional convolution in many embodiments.

In principle, the algorithm works at an arbitrary stage in arbitrary dimensions. The derivation in this case is dependent on the derivation of the corresponding problem in algorithm 1. Algorithm 2 has been represented graphically in FIG. 8. For the two-dimensional case, FIG. 9 shows a schematic representation.

Sequence of Algorithm 2:

Input quantities: WP of the signal, kernel in the local space a) Computing of the transformations of the kernel by means of the auxiliary vectors from algorithm 1; for each target component (component of the result of convolution) there is a transformed kernel Partial output: kernel in the transformed local space (mix of UWP and local space)

b) For each of these transformed kernels a. sub-band convolution of the WP of the input signal and of the transformed kernel b. summation over all sub-bands c. classifying of the result into the component (given by the transformed kernel) of the WP of the result of convolution Output quantities: WP of the result of convolution Note: Step a) has to be made only once in an iterative application.

A third algorithm, also denoted as algorithm 3, is designated as sub-band convolution with result variation.

Also this algorithm is derived from algorithm 1. But it now needs an input in the UWP space, and its output lies likewise in the UWP space.

The principle in this case is to apply the construction of the WPs of the shifted versions of the signal to the result of algorithm 0.

Figure 10:
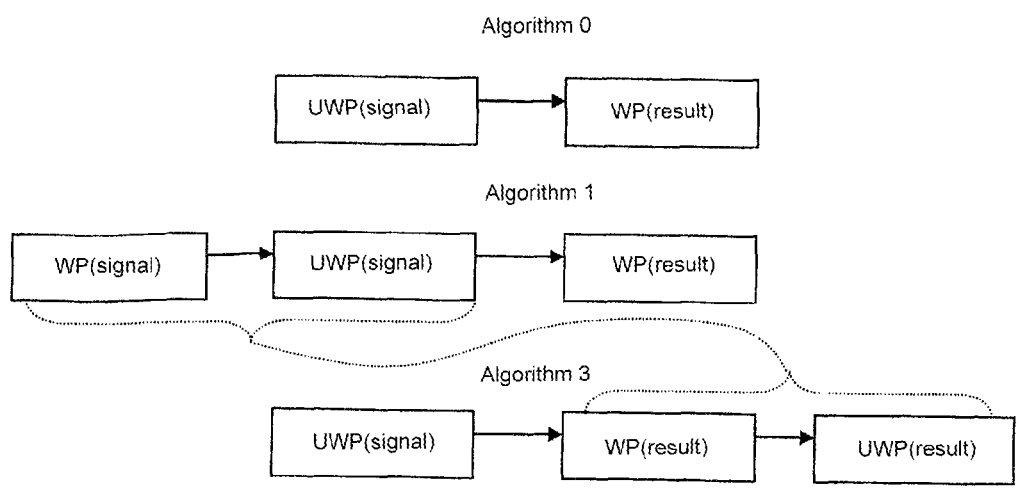
FIG. 10: a schematic diagram for illustrating various convolution algorithms.

This and the differences of algorithms 0, 1 and 3 have been represented schematically in FIG. 10. Whereas in the case of algorithm 1, compared with algorithm 0, a modification is performed in such a way that, instead of the UWT of the signal, the WT of the signal is needed as input quantity; for algorithm 3, algorithm 0 is modified in corresponding manner in such a way that, instead of the WT decomposition of the result, a UWT decomposition of the result is present.

The algorithms presented here enable a direct convolution/deconvolution of compressed data. By virtue of their structure, these algorithms also enable an iterative application without the data having to be decompressed. In this way, an effective computation on large data sets is possible.

As already mentioned, the above algorithms can be used, in particular, for image enhancement, i.e. for iterative deconvolution of image data and of a point spread function, which then corresponds to the kernel g or determines the latter, for example in the apparatus shown in FIG. 5. Further corresponding apparatuses and methods will now be elucidated in more detail with reference to FIGS. 11-18.

Figure 11:
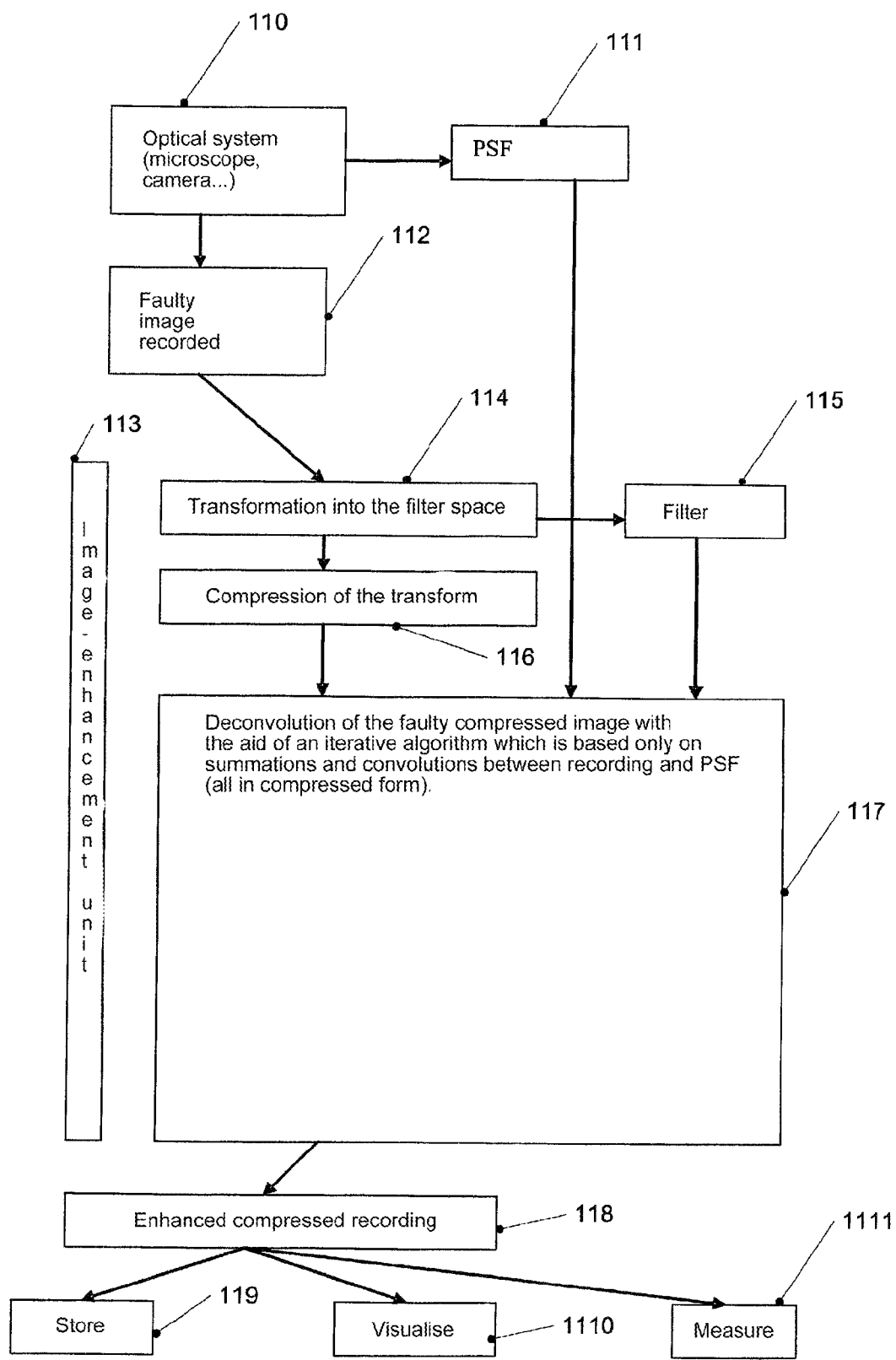
FIG. 11: a detailed block diagram of an apparatus.

In FIG. 11 a schematic diagram of an apparatus according to an embodiment has been represented. The schematic diagram shown in FIG. 11 serves at the same time for illustrating a method according to a corresponding embodiment.

In the embodiment shown in FIG. 11 an optical system 110 serves as image-recording device, which, for example, may include a microscope and/or a camera, for example one of the types of microscope elucidated above. The optical system 110 exhibits a point spread function (PSF) 111, which has the consequence that the recorded image 112 is faulty. Besides an influence of the point spread function, further influences may also result in errors in the image, for example a noise of an image sensor being used.

The image 112 is then supplied to an image-enhancement unit 113. Here at 114 a transformation into the filter space, for example a transformation into the wavelet space by virtue of a wavelet decomposition, is performed by a biorthogonal filter bank 115. At 116 the transform generated in this way is then compressed. In the case of a wavelet decomposition this may, for example, be done by the fact being exploited that many elements of psi components are 0, so that these elements may, for example, be omitted or combined. Also in the case of a lossy compression, elements that are close to 0—that is to say, the absolute value of which, for example, falls below a predetermined threshold value—can be set to 0.

At 117 the faulty compressed image is then deconvoluted with the point spread function with the aid of an iterative algorithm, the algorithm being based only on summations and convolutions between the recorded faulty image and the point spread function (where appropriate, additionally incorporating intermediate results), whereby, as elucidated for the aforementioned algorithms, both the output function and the ultimate result are present only in compressed form and no decompression is performed. In particular, both the compressed image and the result may be present in the wavelet space.

Depending upon the filters being used, further operations for image enhancement may also be carried out. In the case where use is being made of a wavelet decomposition by way of filtering, additionally a denoising, for example, can be carried out directly in the wavelet space.

An example of an iterative algorithm of such a type is the so-called thresholded Landweber algorithm, which will be briefly presented later.

By way of result, the image-enhancement unit 113 outputs an enhanced compressed recording 118. This can be stored at 119, visualised at 1110 (for example, by display on a display screen) and/or gauged at 1111, for example by image analysis, in order by this means to obtain results of measurement of a specimen, the image of which was recorded.

With a view to computing the convolutions at 117, in this case in particular the algorithms 0, 1, 2 and 3 elucidated above, in particular algorithm 1, may come into operation.

Figure 12:
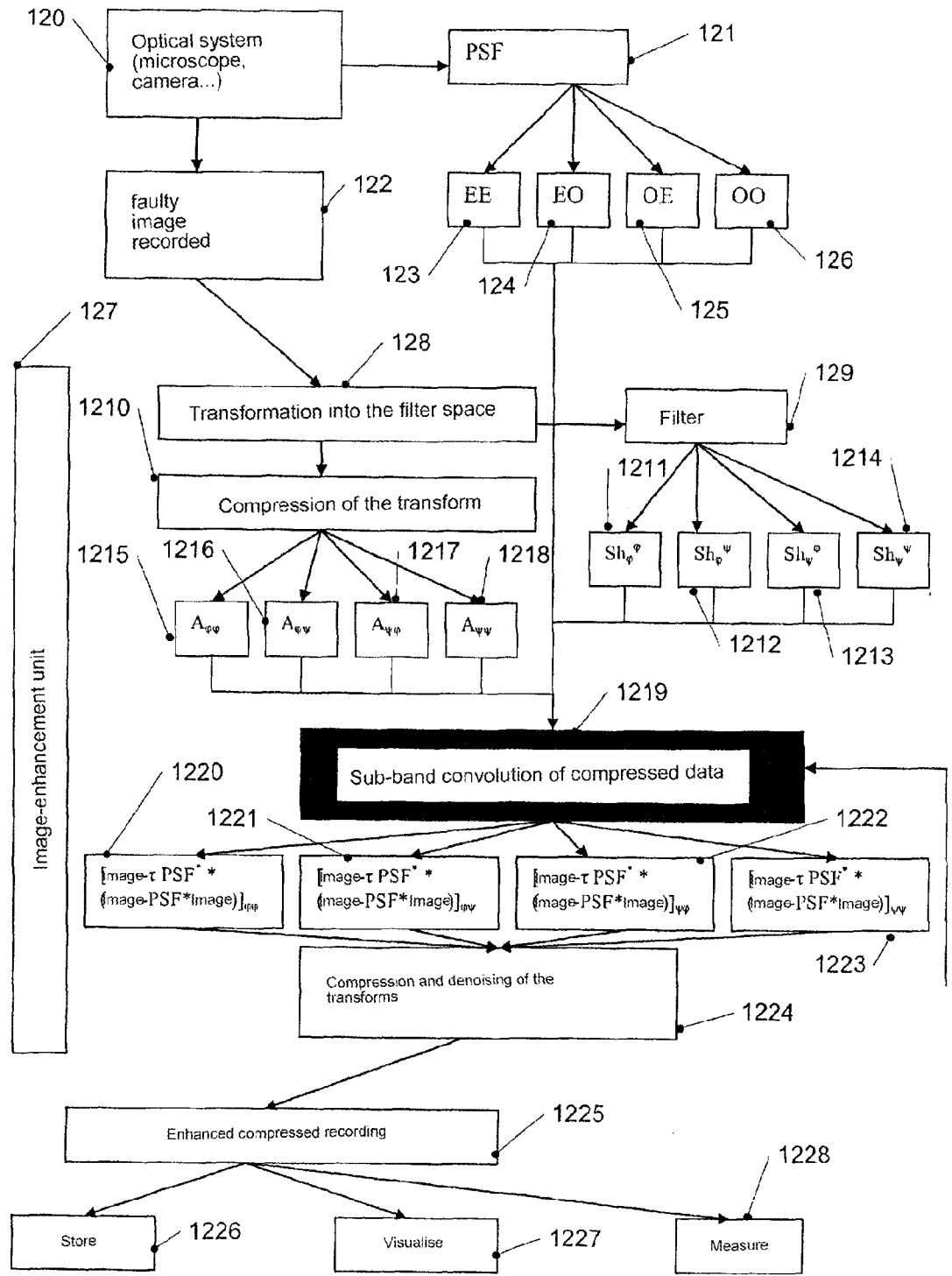
FIG. 12: a detailed block diagram of a further apparatus.

In FIG. 12 a more detailed embodiment has been represented which is based on the embodiment shown in FIG. 11. The embodiment shown in FIG. 12 once again includes an optical system 120 corresponding to the optical system 110 shown in FIG. 11, which records a faulty image 122 and exhibits a point spread function 121. In addition, the embodiment shown in FIG. 12 also exhibits an image-enhancement unit 127. The embodiment shown in FIG. 12 is an embodiment of a one-stage decomposition, i.e. a solitary application of the filter, for example a wavelet filter, in order to decompose the recorded image into psi and phi components.

The point spread function 121 is decomposed into four subcomponents 123-126, which have been designated as EE (even-even), EO (even-odd), OE (odd-even) and OO (odd-odd). The decomposition into components 123-126 corresponds to the decomposition of the kernel into $g_{odd}$ and $g_{even}$ in the above embodiments, here however for a two-dimensional image.

At 128 the image 122 is transformed into the filter space by the filter 129, and at 1210 the image transformed in this way is compressed as described with reference to FIG. 11. In the two-dimensional case shown in FIG. 12 four components $A_{\varphi\varphi}$ 1215, $A_{\varphi\psi}$ 1216, $A_{\psi\varphi}$ 1217 and $A_{\psi\psi}$ 1218 result here. As elucidated with reference to algorithm 1, corresponding auxiliary vectors 1211-1214 (in the two-dimensional case with one-stage decomposition, once again four) are then determined, which have been denoted in FIG. 12 by $Sh_\varphi^\varphi$, $Sh_\varphi^\psi$, $Sh_\psi^\varphi$ and $Sh_\psi^\psi$.

Then the actual algorithm takes place, whereby at 1219 a sub-band convolution of compressed data is carried out, at 1220-1223 correspondingly various components are output, whereby r in FIG. 12 is a parameter, and at 1224 the resulting transforms are compressed and, where appropriate, denoised. This can be repeated several times, i.e. from 1224 a jump back to 1219 can be made.

From this, at 1225 once again an enhanced compressed recording results, which can be stored at 1226, visualised at 1227 and/or gauged at 1228.

Figure 13:
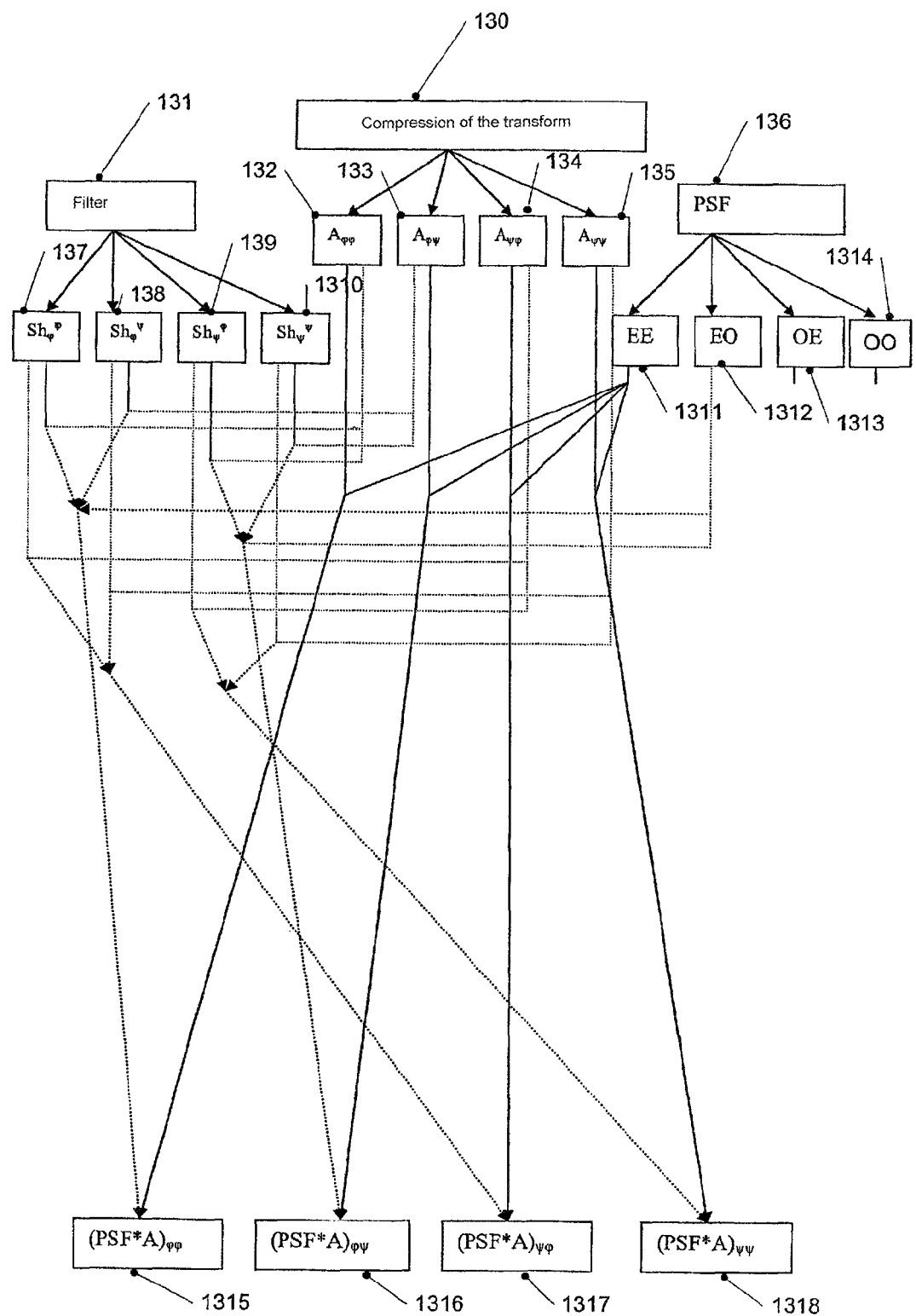
FIGS. 13 and 14A-C: block diagrams for elucidating a convolution in many embodiments.

The sub-band convolution of compressed data (1219 in FIG. 12) will now be elucidated in more detail with reference to FIGS. 13 and 14. In FIG. 13 parts of FIG. 12 have been represented again, namely the filter 131 (corresponding to the filter 129 shown in FIG. 12) with the "auxiliary vectors" 137, 138, 139 and 1310 corresponding to the auxiliary vectors 1211, 1212, 1213 and 1214 shown in FIG. 12, the compression of the transformed image 130 (corresponding to 1210) with the components 132-135 (corresponding to the components 1215-1218 shown in FIG. 12) and the point spread function 136 (corresponding to 121) with the components 1311, 1312, 1313 and 1314. The computation for the EE component 1311 has been represented schematically In continuous values, and the computation for the EO component 1312 has been shown in dotted lines. In FIG. 13, for reasons of clarity the computations for the OE and OO components have not been represented; in FIG. 14 (see below) all the computations have then been represented. There result from this a phi-phi component 1315, a phi-psi component 1316, a psi-phi component 1317 and a psi-psi component 1318 of the convolution of the point spread function with the image in the wavelet space (PSF*A).

Figure 14A:
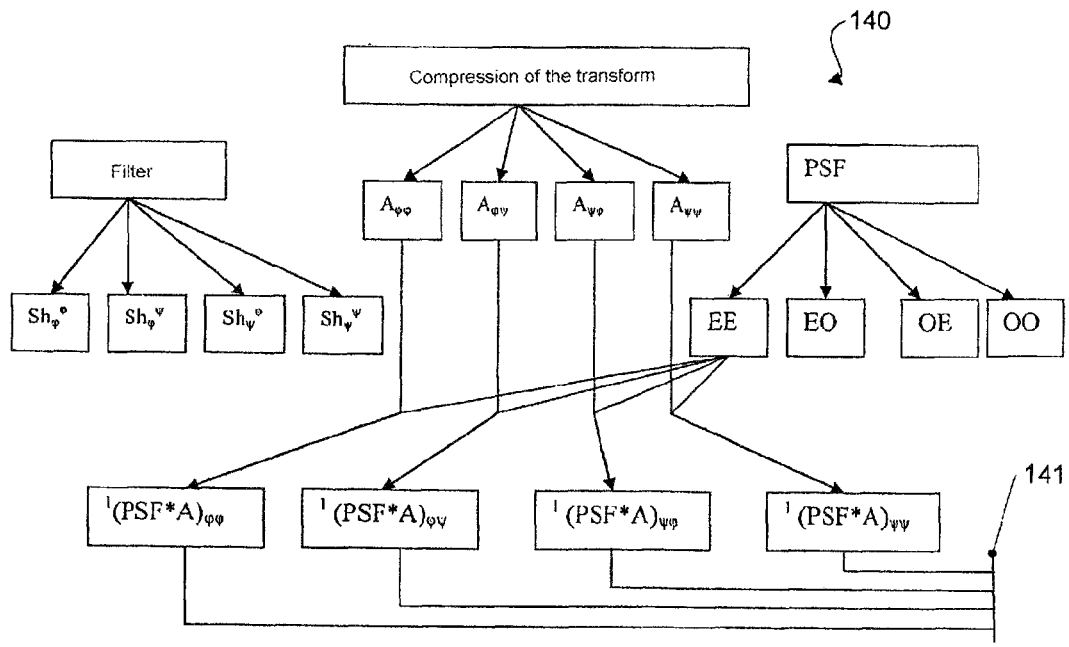
Figure 14A:
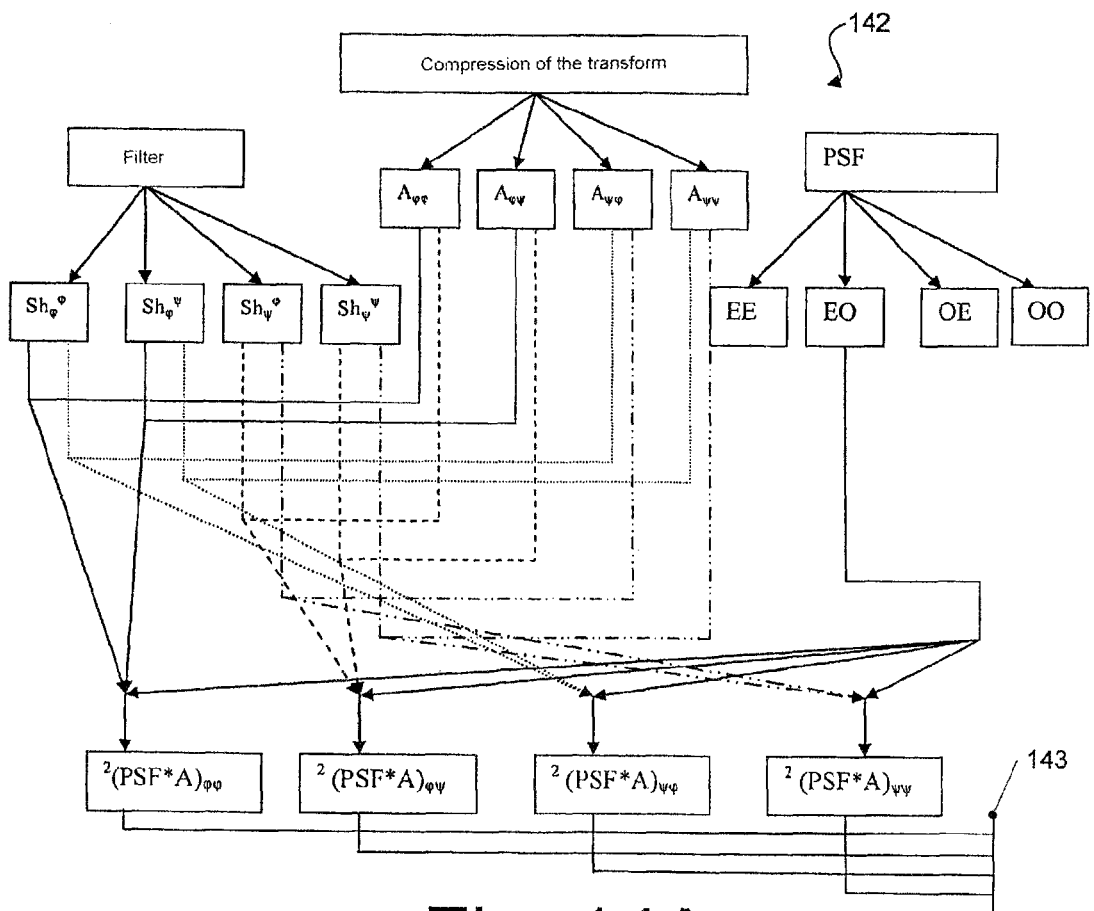
Figure 14B:
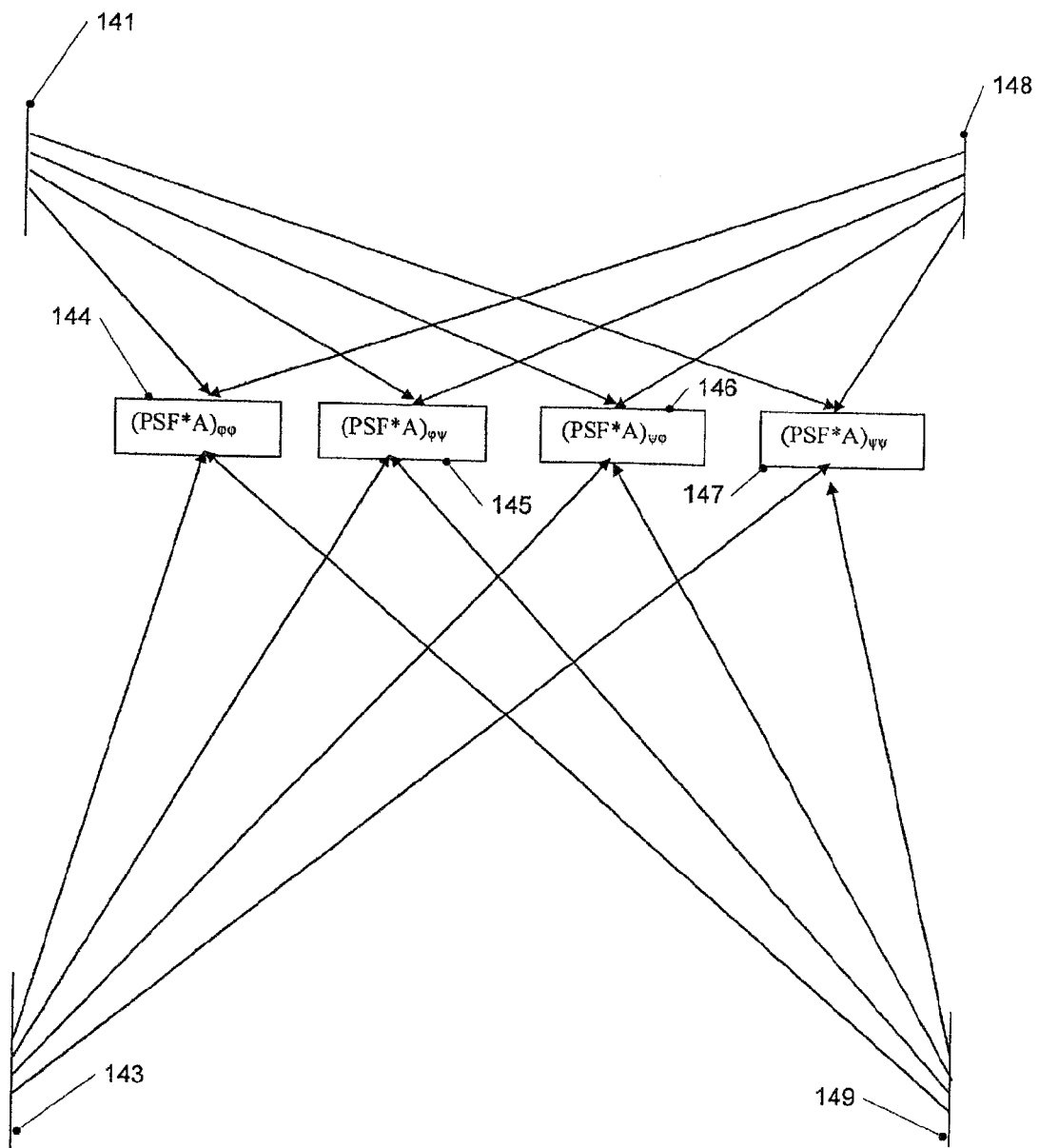
Figure 14C:
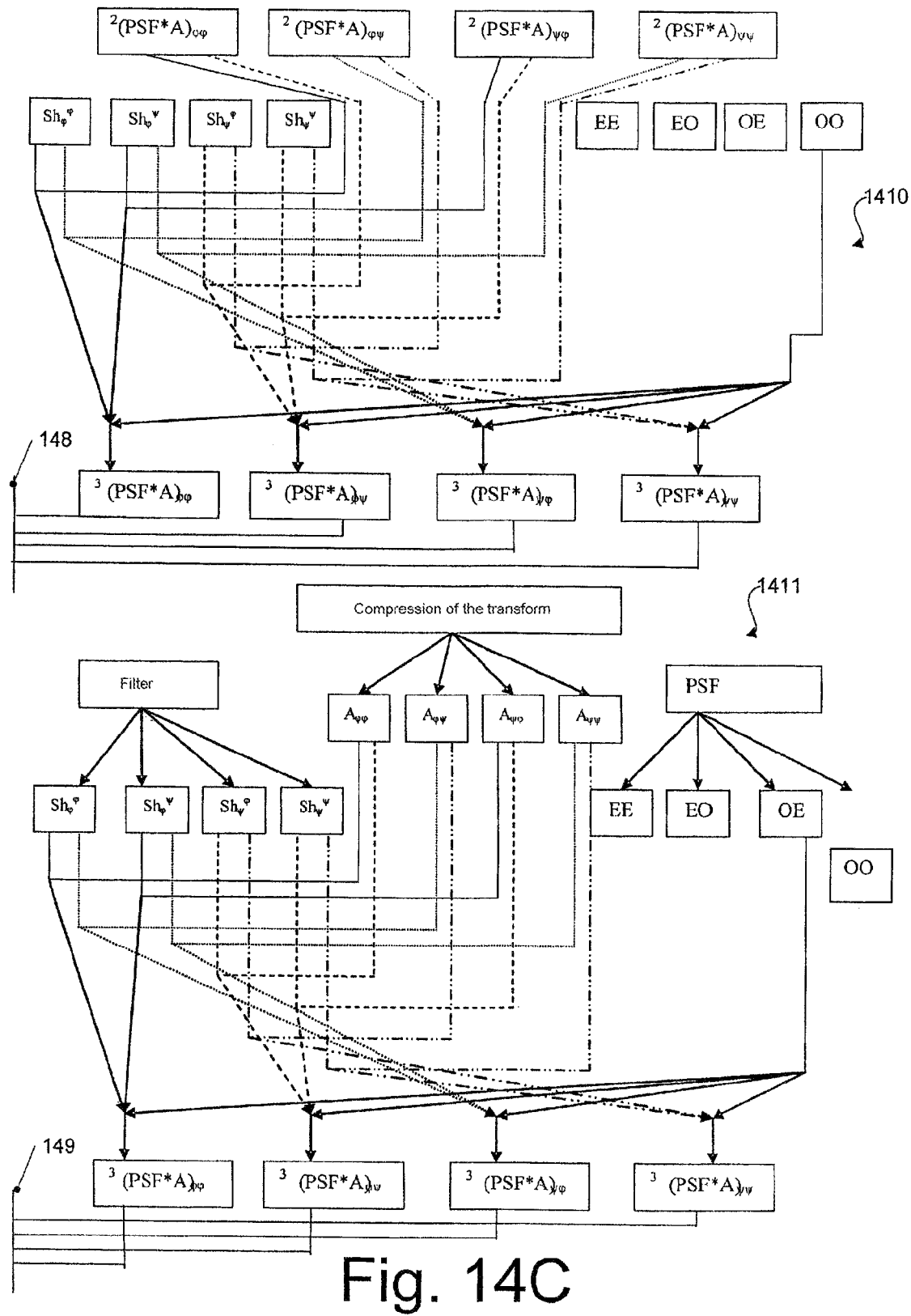

In detail, this state of affairs has been represented in FIGS. 14A-14C. FIGS. 14A-14C are to be regarded as a single FIGURE which was split merely for reasons of space and is designated overall in the following as FIG. 14. The transitions between FIG. 14A and FIG. 14B have been denoted by 141 and 143, and the transitions between FIG. 14B and FIG. 14C have been denoted by 148 and 149, the vertical lines used in the Figures being merely intended to represent the transition.

In FIG. 14 the computation shown in FIG. 13 has firstly been represented separately for each component of the PSF. The computation for the EE component of the PSF (continuous lines in FIG. 13) has been represented by 140, resulting in (sub)components of the convolution components PSF·A, which have been denoted with a superscript one. The corresponding computation for the EO component has been represented by 142, the partial results having been identified by a superscript two. The computation for the OO component (superscript three) has been represented by 1410, and the computation for the OE component of the PSF (results identified by superscript four) has been denoted by 1411. In FIG. 14B it has been represented how the various partial results are brought together, in order to obtain the ultimate wavelet-decomposed components of the convolution between PSF and A (denoted by 144-147).

It should be observed that in the case of the represented algorithm at 1410 the results of 142 instead of the components of the compressed transformed image A are used as input quantities.

Figure 15:
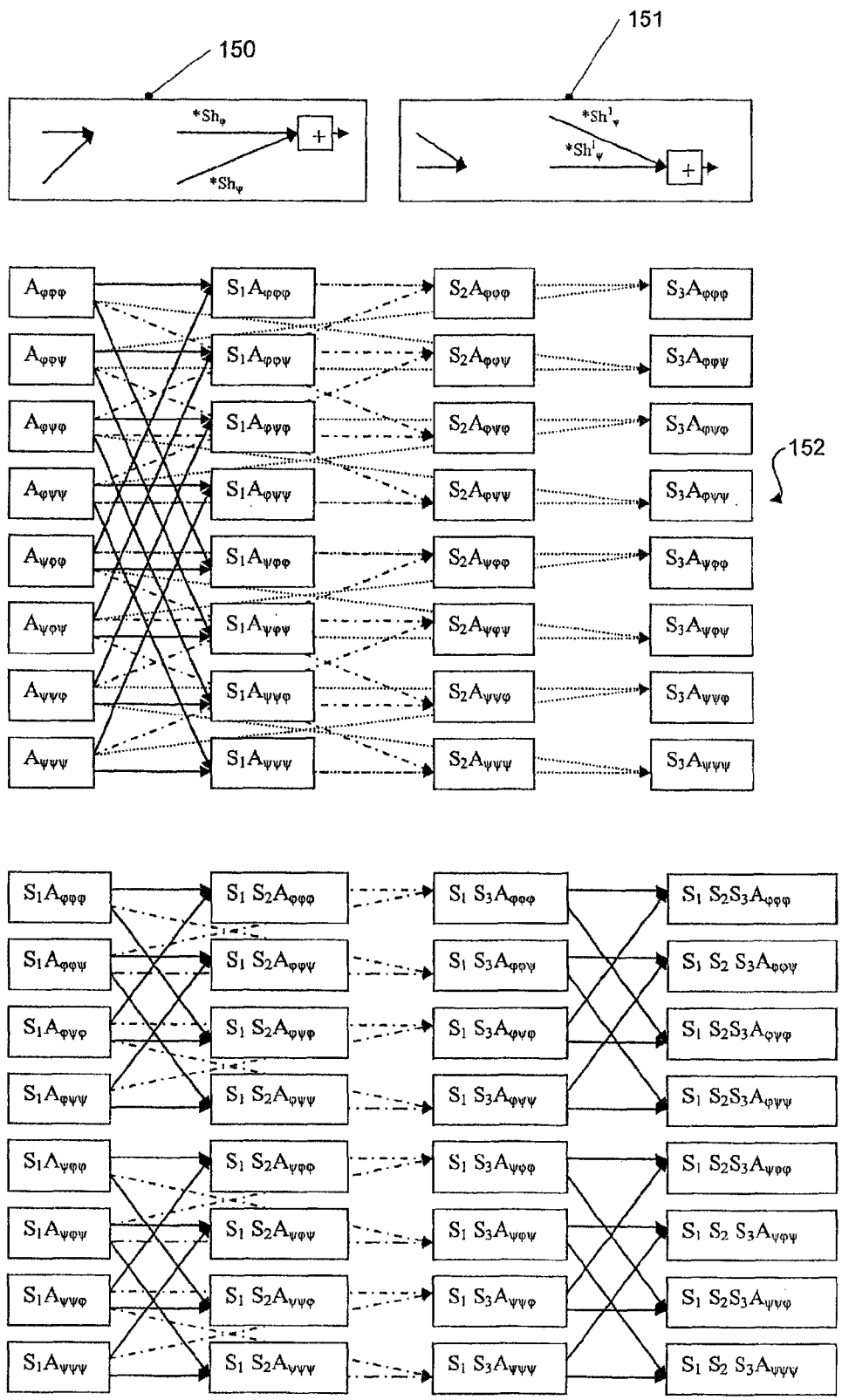
FIG. 15: a diagram for illustrating the application of shift operations in many embodiments.
Figure 16:
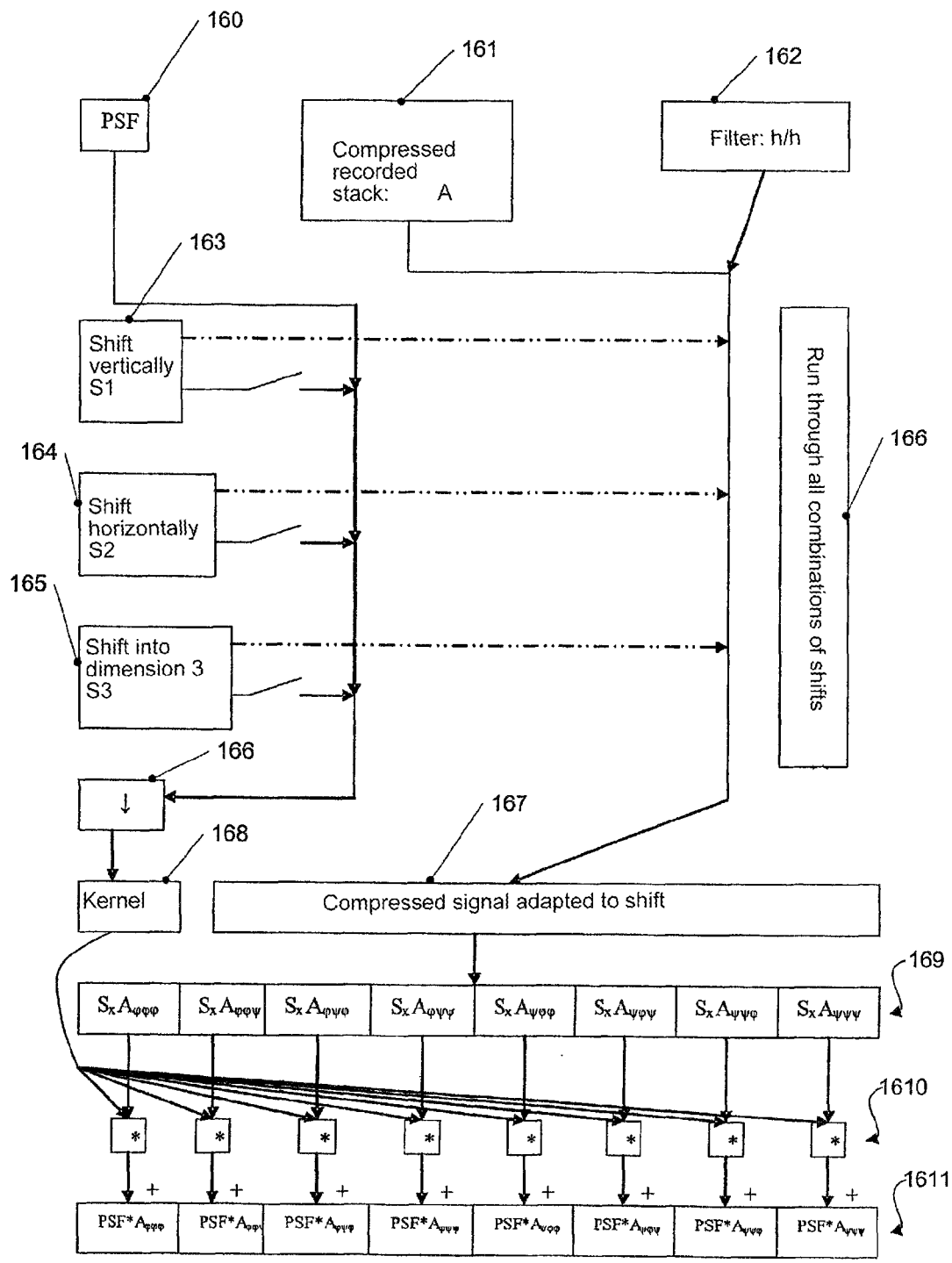
FIG. 16: a block diagram for illustrating the implementation of a convolution operation in many embodiments.

In FIGS. 15 and 16 an appropriate way of proceeding in a three-dimensional case (for example, for a 3D image recording) has been represented schematically. 'Abbreviations' used in the rest of FIG. 15 have been identified by 150 and 151. In particular, the juxtaposition of two parts signifies a convolution of the respective output components with an auxiliary vector Sh and an addition of the result.

By 152 it has been denoted how versions of the original image components A shifted in one direction ($S_1$, $S_2$ or $S_3$) are obtained, and by 153 it has been denoted how the components shifted in all three directions are obtained.

In FIG. 16 a corresponding apparatus and a corresponding method have then been represented schematically.

By virtue of a recording unit a compressed recorded image stack A, corresponding to a three-dimensional image, 161 is provided. In addition, a point spread function 160 used in the course of the recording and a corresponding filter 162 h and $h_1$, for example for implementing a wavelet decomposition, are provided, whereby h and $h_1$, as already mentioned, represent the scaling-function vector as FIR filter and $h_1$ represents the vector derived from h as elucidated above.

By virtue of a device 166 the shifts elucidated with reference to FIG. 15 are executed with shift units 163, 164 and 165, and a compressed signal 167 adapted to the shifts is then generated by the filter 162. A decimator has been denoted by 166 which from the point spread function 160, utilising the shift devices 163-165 as represented, provides an appropriately adapted kernel 168. The compressed signal adapted to the shift has been represented again individually in row 169, the index x in $S_x$ standing for 1, 2, or combinations thereof. In row 1610, convolutions of these components with corresponding components of the kernel 168 are then carried out as described. In row 1611, finally by addition of the results of the convolutions 1610 the results are then obtained, in a manner similar to the two-dimensional case represented in FIG. 14B.

Consequently the invention can be applied not only to one-dimensional and two-dimensional data but also to three-dimensional data, and in corresponding manner also to higher-dimensional data (or even data that have multiple components in some other way, for example if, in the case of image data, colour components have been stored separately and consequently the colour represents, as it were, a further dimension).

Figure 17:
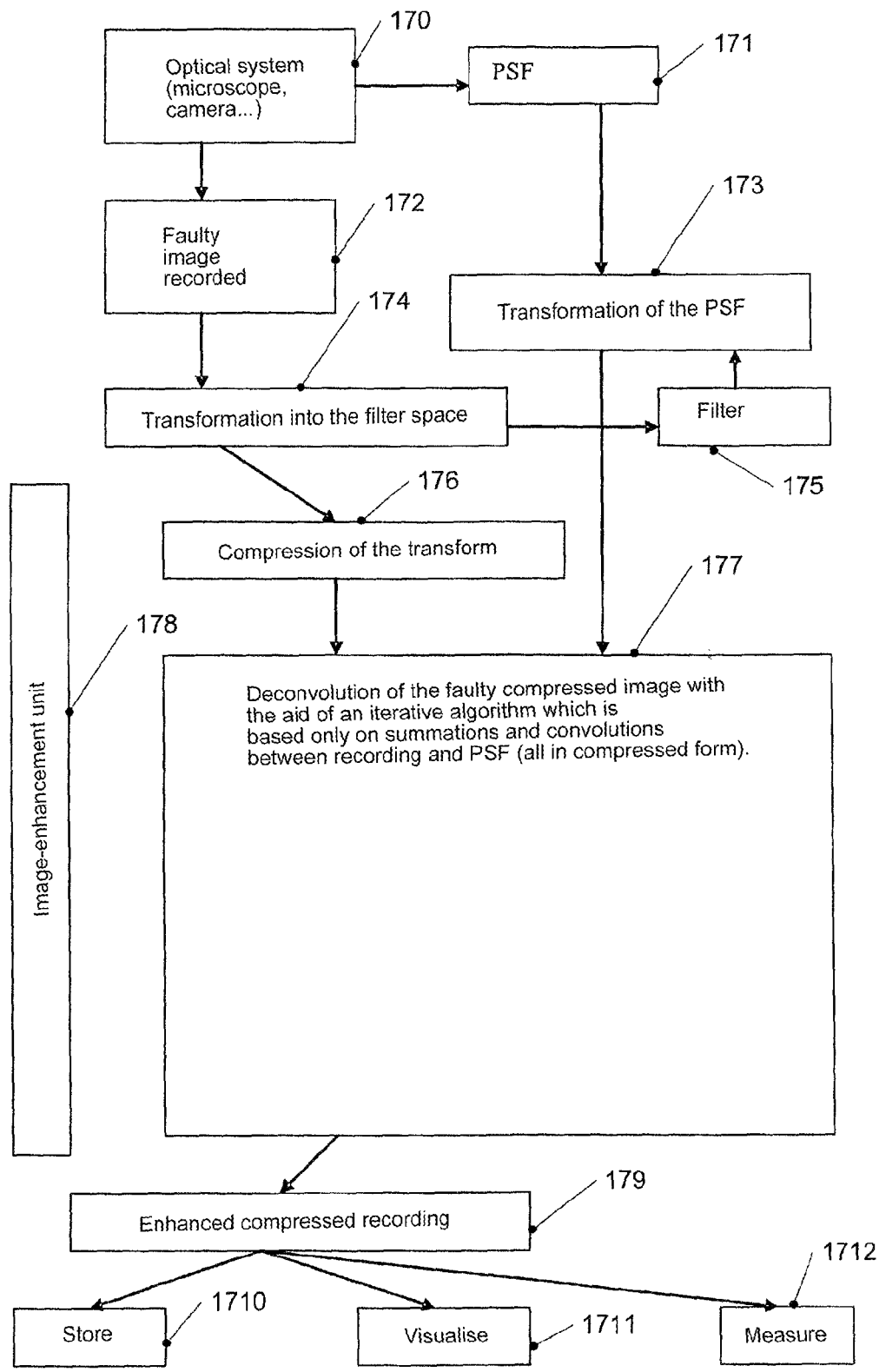
FIG. 17: a block diagram of a further embodiment of an apparatus.

In FIG. 17 a further embodiment of the invention has been represented schematically. In many respects the embodiment shown in FIG. 17 corresponds to the embodiment shown in FIG. 11. Whereas the embodiment shown in FIG. 11 has been designed, in particular, for the use of algorithm 1, the embodiment shown in FIG. 17 has been designed, in particular, for use with algorithm 2, which was described above.

An optical system 170 corresponding to the optical system 110 shown in FIG. 11 records a faulty image 172 and exhibits a point spread function 171. The image 172 is transformed at 174 into the filter space, for example the wavelet space, by a biorthogonal filter system 175, and at 176 the transformed image is compressed.

Corresponding to the explanatory remarks relating to algorithm 2, the filter 175 is also applied to the point spread function 171, in order to generate a transformed point spread function (corresponding to the components $g_\phi^\Phi$ etc. of the above algorithm 2). In an image-enhancement unit 178 a deconvolution algorithm as already described is then applied once again, whereby algorithm 2 using the transformed point spread function 173 now comes into operation.

Once again an enhanced compressed recording 179 results, which can be stored at 1710, visualised at 1711, and/or gauged at 1712.

Figure 18:
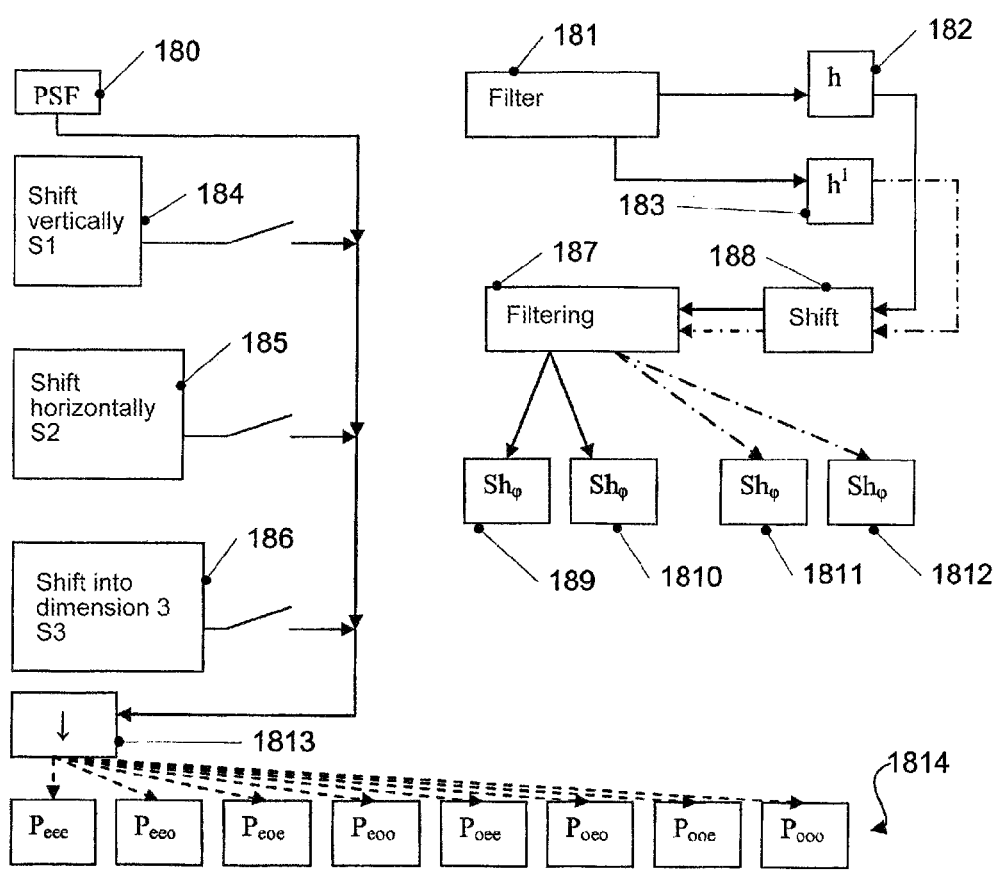
FIG. 18: block diagrams for illustrating many features of many embodiments.

In FIG. 18 a transformation of the point spread function as represented at 173 of FIG. 17 has been represented schematically for the three-dimensional case. The point spread function 180 is processed by shift devices 184, 185 and 186 as well as a decimator 1813, in order to obtain a total of eight components 1814. This corresponds substantially to the transformation represented also in FIG. 16. In addition, in FIG. 18 it has been represented how the auxiliary vectors 189-1812 are obtained from the components h 182 and $h^1$ 183, respectively, of the filter 181 by virtue of shifts 188 and filtering 187.

It should be noted that the above embodiments serve merely for illustration, and other variants are also possible. In particular, the methods and apparatuses according to the invention can be used in any arbitrary dimension, depending upon the image data provided.

The invention claimed is:

1. A method for image enhancement, including: recording an image,
   applying a biorthogonal filter bank to the image, in order to generate an image in the filter space,
   applying a convolution operation to the image in the filter space in such a way that the result of the convolution operation is again present in the filter space, the convolution operation convoluting with a kernel that is based on a point spread function and the convolution operation includes a splitting of the kernel into several components, and
   outputting a result image on the basis of the result of the convolution operation.

2. The method according to claim 1, further including compressing the image in the filter space, wherein the application of the convolution operation takes place on the compressed image and the result of the convolution operation has again been compressed.

3. The method according to claim 1, wherein the several components of the kernel include even and odd components.

4. A method for image enhancement, including: recording an image,
   applying a biorthogonal filter bank to the image, in order to generate an image in a filter space,
   applying a convolution operation to the image in the filter space in such a way that the result of the convolution operation is again present in the filter space, implementing of the convolution operation includes convoluting with a kernel and an application of the biorthogonal filter bank to the kernel, in order to generate components of the kernel in the filter space, and outputting a result image on the basis of the result of the convolution operation.

5. The method according to claim 4, wherein the application of the convolution operation includes a formation of auxiliary vectors on the basis of vectors characterising the biorthogonal filter bank and on the basis of a shift operation.

6. The method according to claim 5 wherein the application of the convolution operation includes a convolution of one of the components of the kernel with one of the auxiliary vectors.

7. The method according to claim 1, wherein a wavelet decomposition is carried out by the biorthogonal filter bank.

8. The method according to claim 1, comprising iterative application of convolution operations, including the convolution operation in order to carry out a deconvolution.

9. An apparatus, comprising:
an image-recording device for recording an image,
a biorthogonal filter bank, in order to obtain an image in a filter space from the recorded image, and
an image-enhancement unit adapted to apply a convolution operation to the image in the filter space in such a way that the result is again present in the filter space, and for outputting a result image on the basis of the result of the convolution operation wherein the convolution operation includes convoluting with a kernel that is based on a point spread function and wherein the application of the convolution operation includes a splitting of the kernel into several components.

10. The apparatus according to claim 9, wherein the image-enhancement unit is adapted to compress the image in the filter space, wherein the application of the convolution operation takes place on the compressed image and the result of the convolution operation has again been compressed.

11. The apparatus according to claim 9, wherein several components of the kernel include even and odd components.

12. An apparatus, comprising:
an image-recording device for recording an image,
a biorthogonal filter bank, in order to obtain an image in a filter space from the recorded image, and
an image-enhancement unit adapted to apply a convolution operation to the image in the filter space in such a way that the result is again present in the filter space, and for outputting a result image on the basis of the result of the convolution operation wherein the application of the convolution operation includes an application of the biorthogonal filter bank to the kernel, in order to generate components of the kernel in the filter space.

13. The apparatus according to claim 9, wherein the application of the convolution operation includes a formation of auxiliary vectors on the basis of vectors characterising the biorthogonal filter bank and on the basis of a shift operation.

14. The apparatus according to claim 13, wherein the convolution operation includes a convoluting with a kernel that is based on a point spread function, wherein the application of the convolution operation includes a splitting of the kernel into several components, and wherein the application of the convolution operation includes a convolution of one of the components of the kernel with one of the auxiliary vectors.

15. The apparatus according to claim 9, wherein the biorthogonal filter bank is adapted to carry out a wavelet decomposition.

16. The apparatus according to claim 9, wherein the image-enhancement unit is adapted to perform an iterative application of convolution operations, including the convolution operation in order to carry out a deconvolution.

* * * * *